United States Patent [19]

Hirabayashi

[11] Patent Number: 4,995,804

[45] Date of Patent: Feb. 26, 1991

[54] APPARATUS FOR QUANTITATIVELY EXTRUDING FOOD MATERIAL

[75] Inventor: Koichi Hirabayashi, Utsunomiya, Japan

[73] Assignee: Rheon Automatic Machinery Co., Ltd., Tochigi, Japan

[21] Appl. No.: 400,798

[22] Filed: Aug. 30, 1989

[30] Foreign Application Priority Data

Oct. 4, 1988 [JP] Japan .................. 63-130038[U]

[51] Int. Cl.$^5$ .................. A21C 5/00; A21C 11/16; B29C 47/00
[52] U.S. Cl. .................. 425/238; 418/15; 418/210; 418/260; 425/241; 425/331; 425/376.1
[58] Field of Search .............. 425/376.1, 308, 238, 425/239, 241, 331, DIG. 230; 418/15, 260, 261, 210, 215

[56] References Cited

U.S. PATENT DOCUMENTS

| | | | |
|---|---|---|---|
| 1,249,881 | 12/1917 | Anglada | 418/260 |
| 1,804,604 | 5/1931 | Gilbert | 418/15 |
| 1,833,275 | 11/1931 | Burmeister | 418/15 |
| 2,280,272 | 4/1942 | Sullivan | 418/260 |
| 2,485,595 | 10/1949 | Hamman | 425/448 |
| 3,481,283 | 12/1969 | Vogt | 425/241 |
| 3,773,448 | 11/1973 | Poot | 425/241 |
| 4,142,805 | 3/1979 | Tadmor | 425/376.1 |
| 4,684,040 | 8/1987 | Jonovic et al. | 425/241 |
| 4,801,258 | 1/1989 | Hayashi et al. | 425/238 |

FOREIGN PATENT DOCUMENTS

| | | | |
|---|---|---|---|
| 1067648 | 1/1954 | France | 425/241 |
| 367027 | 1/1939 | Italy | 425/241 |

OTHER PUBLICATIONS

Above foreign references were cited against earlier application of Hirabayashi et al.

Primary Examiner—Willard Hoag
Attorney, Agent, or Firm—Finnegan, Henderson, Farabow, Garrett & Dunner

[57] ABSTRACT

An apparatus for quantatively extruding food material is provided. In this apparatus the material is introduced into a space formed between the periphery of a drum and the side wall of a housing. The space is divided into sections defined by flanges, and thus the material is divided into portions and introduced into each section. The drum has an inner chamber between its inner wall and the periphery of a cam. Blades are inserted into slits in the drum periphery, and adjacent pairs of blades form compartments in the sections in the outside of the drum as well as in the inner chamber.

The apparatus has a plurality of exit ports communicating with the respective sections. Since the dimensions of the compartments in each section decrease toward the exit ports, while the dimensions of the compartment in the inner chamber increased, the pressure in the outer compartments becomes higher than that of the inner chamber. Thus the air in the material is drawn out of the outer compartments via a path formed between the recess on the trailing surface of each blade and the wall of each slit. As a result, material of a uniform quantity is extruded from each exit port.

8 Claims, 6 Drawing Sheets

APPARATUS FOR QUANTITATIVELY EXTRUDING FOOD MATERIAL

BACKGROUND OF THE INVENTION

1. Field of the Invention

This invention relates to an apparatus for quantitatively extruding food material, typically a plastic food material, and more particularly to an apparatus for supplying a continuous body of food material, uniform in quantity and density throughout the portions of the body, while removing air trapped during the process.

2. Prior Art

U.S. Pat. No. 4,801,258 discloses an apparatus for quantitatively extruding food material. In this apparatus the material is introduced into the space formed between the periphery of a drum and the side wall of a housing. The drum has an inner chamber between its inner wall and the periphery of a cam. A pair of blades is inserted into slits formed on the drum from a compartment in the outside of the drum and a compartment in the inner chamber.

Since the dimensions of the space in the compartment outside of the drum decrease towards the exit port, while the space of the inner chamber increases, the pressure in the outer compartment becomes much higher than that of the inner chamber. Thus the air in the material is drawn out of the outer compartment into the inner chamber via a path formed between the recess on the trailing surface of the blade and the wall of the slit. As a result a cylindrical body of material of a uniform quantity and density, and that has no air entrainment, is extruded from the exit port.

Usually a row of exit ports are provided on a housing for extruding a number of cylindrical bodies of food material. Such exit ports are arranged in the axial direction of the housing. However, when the material clogs one of the exit ports, the material which should be extruded from that exit port moves to and is extruded from its adjacent ports, and thus the quantity of the material extruded from the other exit ports changes. Further, food material such as dough or minced meat tends to clog exit ports. Therefore, in this apparatus of the prior art where the material is extruded from a plurality of exit ports, a uniform supply of food material is not assured.

SUMMARY OF THIS INVENTION

The object of this invention is to secure a uniform supply of food material when a plurality of exit ports are provided to the above apparatus of the prior art.

According to this invention, an apparatus for quantitatively extruding food material is provided, comprising:

(a) a hopper for food material, (b) an eccentrically formed cylindrical housing mounted to the bottom of said hopper, having a cylindrical side wall, which is open at the top part that faces the hopper, and two end walls, said housing being provided with a plurality of exit ports positioned away from said hopper and arranged on said cylindrical side wall in the axial direction of said housing, (c) a rotating hollow cylindrical drum disposed in said housing, operatively connected to an axis, said axis in turn being connected to a motor, said drum having a plurality of slits formed radially through the peripheral body thereof and extending in the axial direction of said peripheral body, said side wall of said housing so formed that the periphery of said drum and the inner surface of said side wall of said housing downstream of said hopper in the direction of rotation of said drum defining a space progressively narrowing in its cross-section toward said exit ports, and slidably engaging each other downstream of said exit ports in the direction of rotation of said drum, said drum further having a plurality of flanges formed on the peripheral body thereof, and extending to engage the inner surface of said housing to divide said space into as many sections as the number of said exit ports, said sections communicating with the respective exit ports, (d) a plurality of blades, inserted into each of said slits, and of cross-sectional dimensions defined such that they slidably fit in said slits, each said blade being provided with a recess on its trailing surface whose length is greater than the thickness of the peripheral body of said drum, (e) an eccentric cylindrical cam mounted on said axis of said drum, the periphery thereof being radially spaced apart from the inner surface of said side wall of said housing by a distance equal to the radial width of said blades, engaging said peripheral body of said drum at the top portion of said drum and being progressively separated from said peripheral body in the direction of rotation of the drum defining an inner chamber together with the end walls of the housing, and enlarging in its cross-section toward said exit ports, (f) an exit path connecting said inner chamber to said hopper, wherein each of said blades is slidably movable as said drum rotates along said periphery of said eccentric cam and said inner surface of said side wall of said housing, so that when the rotation brings said blade to face the bottom of said hopper the outward part of said blade is arranged to protrude into said hopper to introduce said food material into each of said sections of said space to said inner chamber for releasing into said inner chamber the air trapped in a compartment formed by said two adjacent blades and the drum, an adjacent pair of said flanges or one said flange and an end wall and the inner wall of said housing, and to retract to a point where the outward end of said blade becomes flush with the periphery of said drum when said blade has moved past said exit ports.

In the apparatus of this invention the space into which the food material is introduced is divided into sections. These sections are sealed by an adjacent pair of flanges or one flange and an adjacent end wall of the housing, which sections are further defined between the peripheral body of the drum and the side wall of the housing. At some stage of the rotation of the drum, in each section a compartment is formed between an adjacent pair of blades. Therefore, even when the material clogs one of the exit ports, the material in the section communicating with the exit port is enclosed in the section, and thus cannot flow into adjacent sections. Accordingly the material is prevented from being extruded from the adjacent exit ports. Therefore, an uneven supply of food material can be completely eliminated.

EMBODIMENTS

A first embodiment of this invention will now be described by reference to the drawings.

Figure 1:
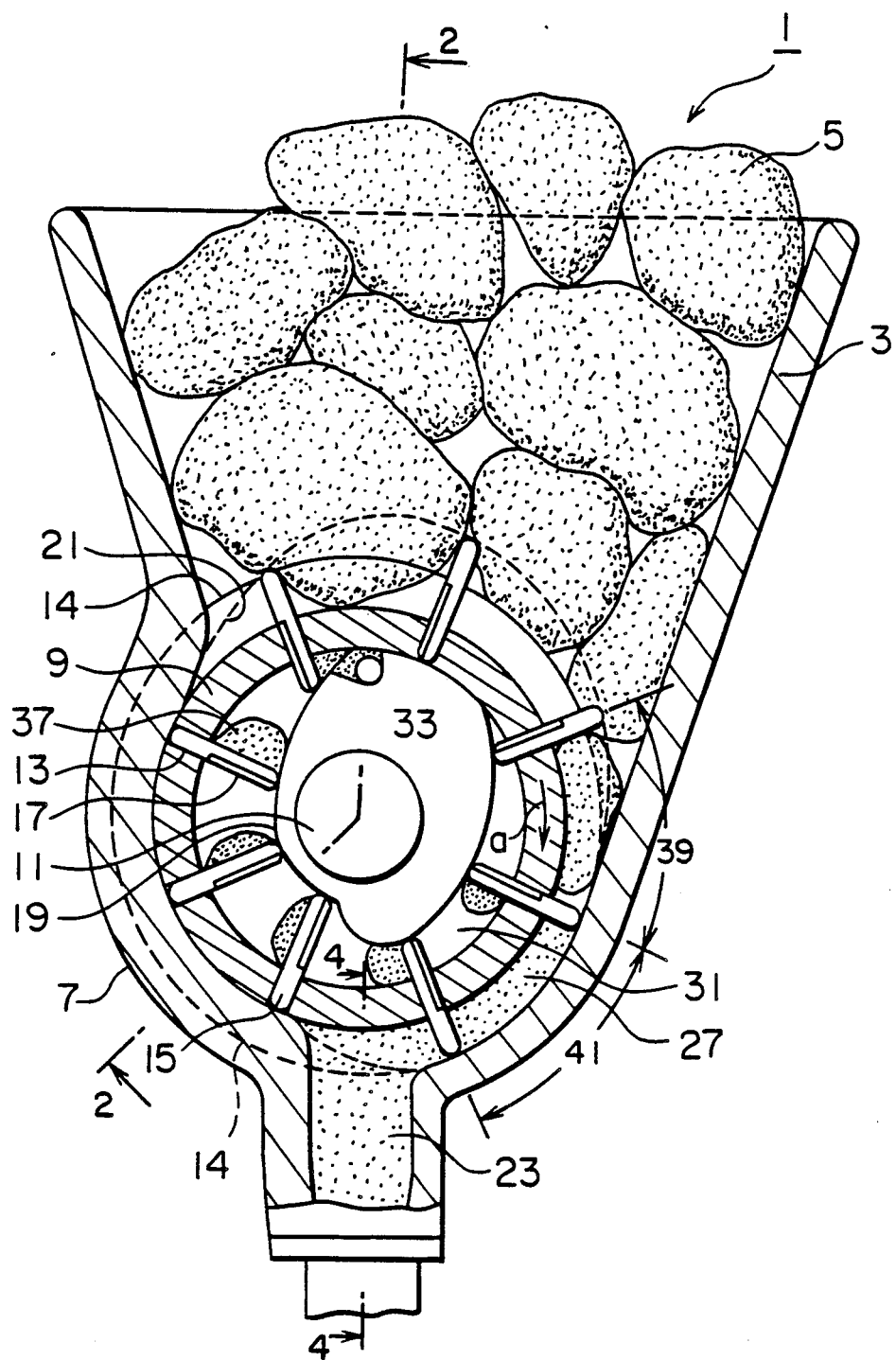
FIG. 1 shows an apparatus of a first embodiment of this invention.

The apparatus (1) includes a hopper (3) for the food material (5) and an eccentrically formed cylindrical housing (7) integrally mounted on the bottom of the hopper (3). In FIG. 1 the walls of the housing (7) are integrally connected to the walls of the hopper (3). The housing (7) has in it a rotating hollow cylindrical drum (9). The drum (9). is operatively connected to an axis (11), which is a drive shaft connected to a motor (not shown).

Figure 3:
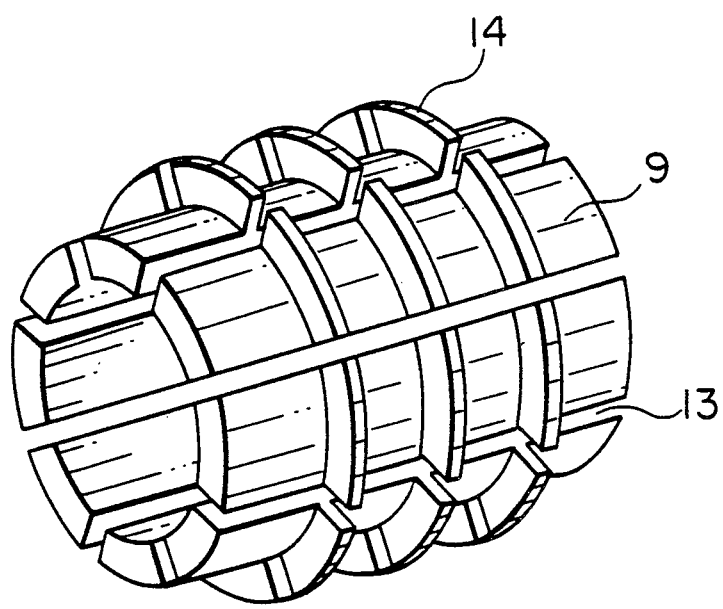
FIG. 3 shows a perspective view of the drum used in the apparatus of FIG. 1.

As shown in FIGS. 1 and 3, the drum (9) has a plurality of slits (13) formed radially through its peripheral body at a certain distance between them. The slits (13) also extend in the axial direction of the peripheral body.

Further, a plurality of outwardly extending flanges (14) are provided on the periphery of the drum (9). These flanges are arranged in the axial direction of the drum (9) and spaced apart from each other at a distance.

As shown in FIG. 1, in each of the slits (13) a blade (15) is inserted. Its dimensions are such that it fits snugly, and is slidable, in the slit.

On the trailing surface of each blade (15) in the direction of rotation of the drum (9) a recess (17) is formed and extends in the radial direction over a distance slightly greater than the thickness of the peripheral body. The recess (17) may axially extend over almost the entire length of the blade (13).

An eccentric cam (19) is fixedly mounted to the end walls (25) of the housing (7) and is positioned in the hollow interior part of the drum (9) in sliding engagement with the axis (11). The periphery of the cam (19) is radially spaced apart from the inner wall of the housing (7) by a distance equal to the radial width of the blades (15). On both end walls of the housing (7), in the area where it faces the hopper (7), steps (21) are formed to hold the blades (15) in place. The steps (21) are spaced apart from the periphery of the cam (19) by a distance that is equal to the blade's radial width. Therefore when the drum (9) is rotated the blades (15) move in the same direction as the drum (9) while the outward ends of the blades (15) engage the inner wall of the housing (7), and the steps (21) and the inward ends of the blades (15) engage the periphery of the cam (19).

Figure 4:
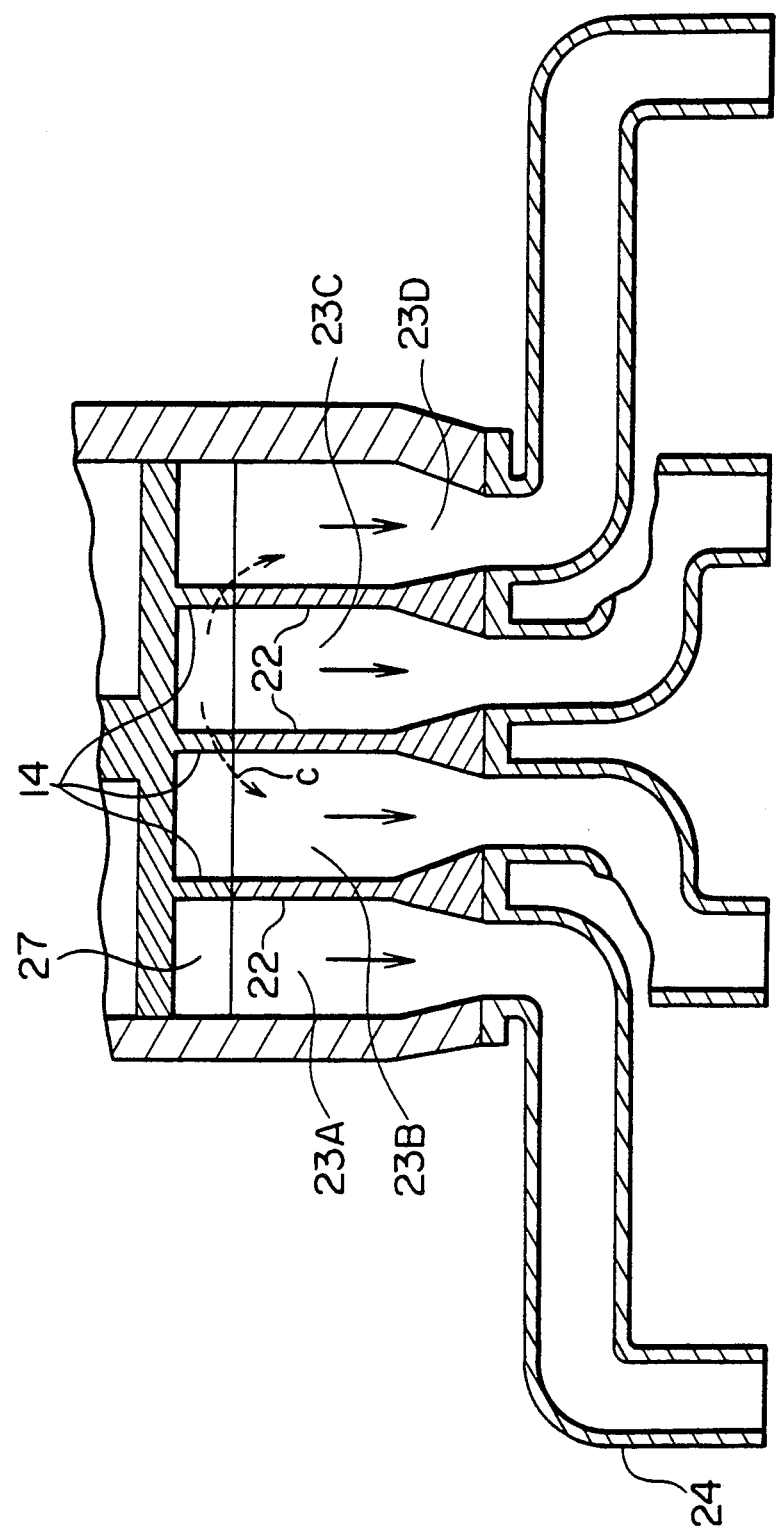
FIG. 4 shows the enlarged cross-sectional view of the exit ports of the apparatus cut along the line B-B' in FIG. 1.

The housing has a plurality of exit ports (23) positioned away from said hopper (3). In this embodiment four exit ports (23A, 23B, 23C, 23D) are arranged in the axial direction of the housing (7). As shown in FIG. 4, the exit ports (23) are connected to their respective nozzles (24) so that cylindrical bodies of the material are properly extruded from the apparatus (1) without touching each other. The flanges (14) are formed so that their outward ends engage the walls (22) which separate the four exit ports when they arrive in the area of the exit ports.

As shown in FIG. 1, the side walls of the housing are connected with the side walls of the hopper (3). The housing (7) also has two end walls (25, FIG. 2) to enclose the drum (9) and the cam (19). The side wall of the housing (7) has an eccentric-shaped cross-section so that its inner surface and the periphery of the drum (9) downstream of the portion of the drum (9) facing the hopper (3) in the direction of rotation of the drum (9) shown by an arrow a in FIG. 1 define a space (27) progressively narrowing in its cross-section toward the exit ports (23). However, the inner surface of the side wall of the housing (7) contacts the periphery of the drum (9) in the area downstream of the exit port (23) in the direction of rotation of the drum (9) as shown in FIG. 1.

Figure 2:
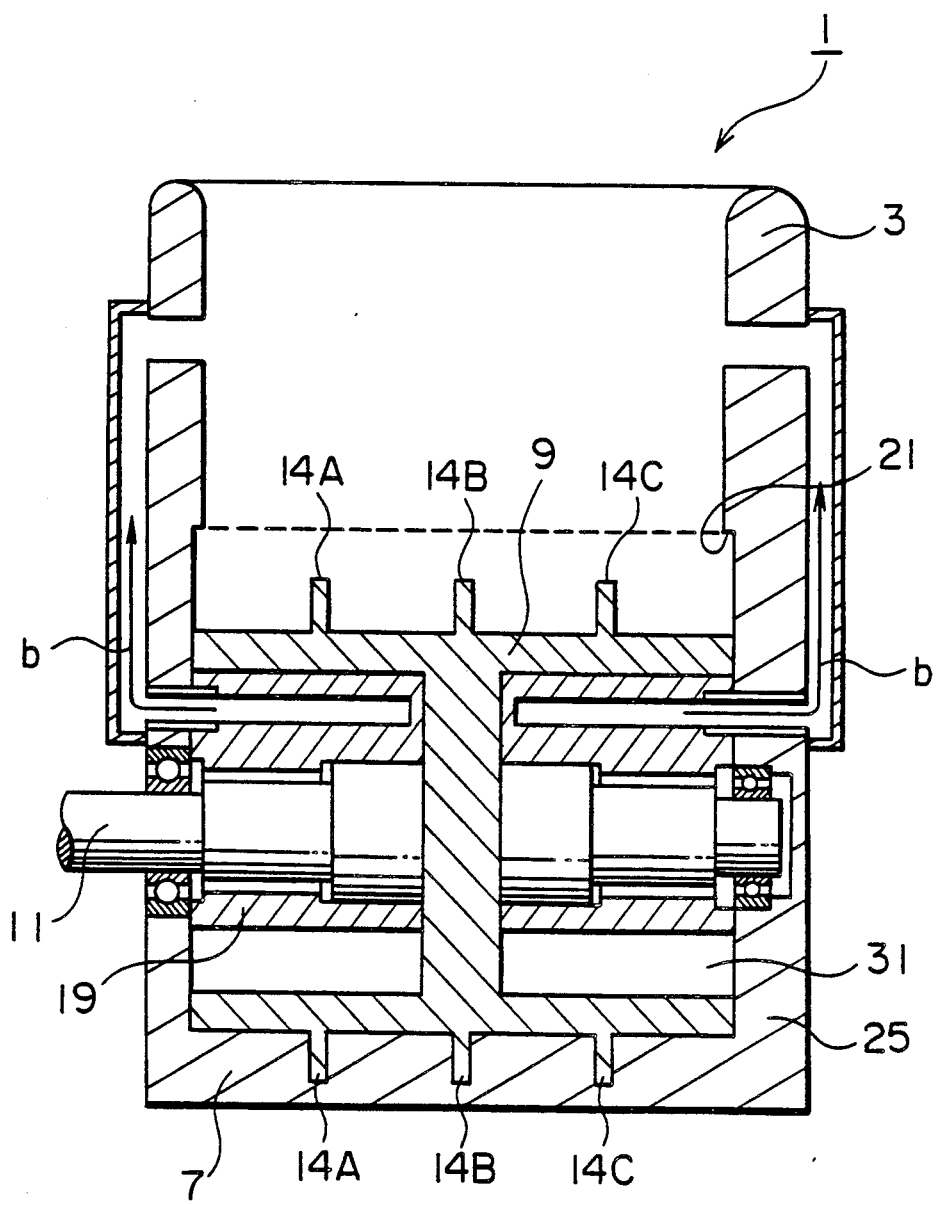
FIG. 2 shows the cross-sectional view of the apparatus cut along the line A-A' in FIG. 1.

The flanges (14) are formed so that their outward ends extend to engage the inner surface of the side wall of the housing in the area upstream of the exit ports (23). Therefore, the flanges (14) divide the space (27) into sections, whose each number of which numbers corresponds to the respective numbers of the exit ports. In this embodiment, the space (27) is divided by three flanges (14A, 14B, and 14C) to define four sections as shown in FIG. 2. Therefore, in this area the material (5) is shut in each section of the space (27) and cannot move into the adjacent sections. In the area that is downstream of the exit ports (23), grooves to receive the flanges (14) are provided in the side wall of the housing (7) as shown in FIGS. 1 and 2.

An inner chamber (31) is formed between the periphery of the cam (19) and the inner wall of the peripheral body of the drum (9), except for the area where the cam (19) contacts the drum (9). The cam (19) is designed to have an eccentric shape. The surface of the cam is equidistant from the inner surface of the side wall of the housing. The positional relationship of the cam (19) and the drum (9) is such that the inner chamber progressively enlarges in its cross-section from the position near the hopper (3) toward the exit ports (23) in the direction of rotation of the drum, and, after an area of uniform dimensions, narrows towards the downstream end, where the periphery of the cam (19) engages the inner wall of the peripheral body of the drum (9) at the top portion of the housing (7) facing the hopper (3).

Near the point where the inner chamber (31) disappears an exit path (33) is formed. The exit path connects the inner chamber (31) and the hopper (3) through the cam (19) as shown in FIGS. 1 and 2.

In this embodiment, the space (27) has a uniform dimension section (41) downstream of the decreasing dimension section (39) and adjacent and upstream of the exit ports (23) in the rotational direction a. In this uniform dimension section, the dimensions of the space (27) and those of the inner chamber (31) are uniform.

In this apparatus a compartment is formed between an adjacent pair of blades (15) in the inner chamber (31) and in the space (27). Since the drum (9) and the cam (19) are enclosed in the housing (7), the compartments are sealed by the end walls (25) and the side wall of the housing (7) and the periphery of the cam (19), as shown in FIG. 2. As stated above, the space (27) in the compartment is divided into the four sections by the flanges (14).

In operation the drum (9) rotates clockwise as shown by an arrow a in FIG. 1. At the top part of the housing (7) the outward end of the blade (15) protrudes into the hopper (3). When the protruding blade rotates along with the rotation of the drum (9), it pushes the food material into the space (27) between the inner surface of the side wall of the housing (7) and the drum (9). In the area upstream of the exit ports, the outward ends of the flanges engage the inner surface of the side wall of the housing into four sections. The material (5) is divided into four parts and introduced into each section. Further, the outward end of the blade (15) engages the inner surface of the side wall of the housing (7) to define a sealed compartment, together with an adjacent blade (15), the drum (9), and two adjacent flanges or one flange and one of the end walls (25). The material introduced into the space (27) is confined in the compartment and moves in the rotational direction a, as shown in FIG. 1.

In the decreasing dimension section (39), as the drum (9) rotates, the volume of the compartment formed by an adjacent pair of blades, the drum, the side wall, and flanges (14) (or a flange and an end wall of the housing), progressively decreases. In contrast, the periphery of the cam (19) and the inner wall of the peripheral body of the drum (9) separate from each other to form the inner chamber (31). Compartments are formed in the inner chamber with the cam, the drum, adjacent pairs of blades (15) and the end walls of the housing (7), and the volume of each compartment progressively enlarges as the drum (9) rotates up to the area near the downstream end of the exit ports (23).

When the material is introduced from the hopper (3) into the space (27), air tends to be trapped in the material and first enters the formed compartment. As shown in FIG. 1, the air tends to gather at the downstream part of the compartment.

Since the recess (17) of the blade (15) extends over a distance greater than the thickness of the drum (9), at some point dupring the rotation of the drum (9) the blade (15) becomes positioned so that the recess (17) stretches beyond both surfaces of the drum (9). At this point the space (27) communicates with the inner chamber (31) via a path formed by the recess (17) between a wall of the slit (13) and the blade (15), as shown in FIG. 1. The space in the compartment formed outside of the drum (9) becomes smaller as the drum (9) rotates, and thus the pressure within the compartment increases, while the space of the inner chamber (31) increases and thus the pressure within the compartment inside of the drum (9) decreases. Thus, the pressure of the space (27) becomes much greater than that of the inner chamber (31). Due to the pressure difference, air (35), together with a fractional portion of the material (37), is forced from the space (27) into the inner chamber (31). Thus, as the drum (9) rotates, air in the outer compartment is removed from the space (27), and only the material (5) fills the space (27) before the compartment arrives at an area adjacent the exit port (23), as shown in FIG. 1.

Then the compartment arrives in the uniform dimensions section (41). As stated above, the uniform dimensions section (41) is located upstream of the exit ports (23) in the rotational direction a. Since the dimensions of the space (27) and those of the inner chamber (31) in this section (41) are uniform, the pressure in the space (27) and the inner chamber (31) defined by an adjacent pair of blades (15) is kept uniform. Without such uniform dimensions, that is, if the space (27) were so formed that its dimensions were to gradually decrease toward the exit ports (23), the pressure at the upstream portion of the material in any outer compartment would be lower than that at the downstream portion. Thus, the pressure to extrude the material via the exit ports (23) would not be uniform. Thus, if the material were to be extruded from the exit ports (23) it would pulsate at a cycle synchronized with the arrival of the blades (15) at the exit ports (23). Therefore, the flow rate of the material extruded would not be uniform if viewed microscopically. Such a feature can be a drawback for some applications.

However, in this embodiment the material (5) in the uniform dimensions section (41) is subjected to uniform pressure throughout the space between an adjacent pair of blades (15) until it is carried to the portion adjacent an exit port (23). Thus it is uniformly extruded from the exit port (23). This uniform dimensions section (41) should extend at least a distance equal to that between an adjacent pair of blades (15). Moreover, the position of the blade (15) relative to the drum (9) may shift in this section (41) to such a point that the recess (17) on the trailing surface of the blade (15) is concealed behind the periphery of the drum (9) to close the path connecting the space (27) and the inner chamber (31) so that the air (35) in the inner chamber is prevented from flowing back into the space (27). As a result, material that is uniform in quantity and density, and that has no remnant of air, is extruded via the exit ports (23).

As we discussed above, without the flanges (14), when the material clogs one of the exit ports, for example, the second exit port from the right in FIG. 4, the material which should be extruded from the second port would flow into the adjacent exit ports as indicated by arrows c in FIG. 4. Therefore, the quantity of the material (5) extruded from the adjacent ports would increase. However, in this invention each section is sealed from the other sections by an adjacent pair of flanges or one flange and an end wall of the housing. Thus, the material (5) cannot flow into the adjacent sections and the extrusion of the material (5) from one exit port cannot affect the material (5) extruded from the other exit ports.

When the blade (15) moves past the exit ports (23), the blade (13) retracts to a point where its outward end becomes flush with the periphery of the drum (9), and the periphery of the drum (9) contacts the inner wall of the housing (7). As shown in FIG. 1, the capacity of the inner chamber (31) between any adjacent pair of blades (15) is uniform until the leading blade forming a compartment approaches the point where the blade begins to be exposed to the bottom of the hopper (3). From that point on the inner chamber (31) progressively decreases its space until the periphery of the cam (19) contacts the inner wall of the drum (9) and thus the inner chamber (31) disappears at the top part of the housing (7).

As the drum (9) rotates, the fractional portion of the material (37) in the inner chamber (31) moves toward the top part of the housing (7), being pushed by the leading surface of the blade (15). Adjacent the top part of the housing (7), where the inner chamber (31) disappears, the exit path (33) is formed through the cam (19) to remove the material (37) and the air (35) trapped in the inner chamber (31) by the propelling force of the blade (15). The material (37) and the air (35) returns to the hopper (3) via the exit path (33) as shown by arrows b in FIG. 2.

Figure 5:
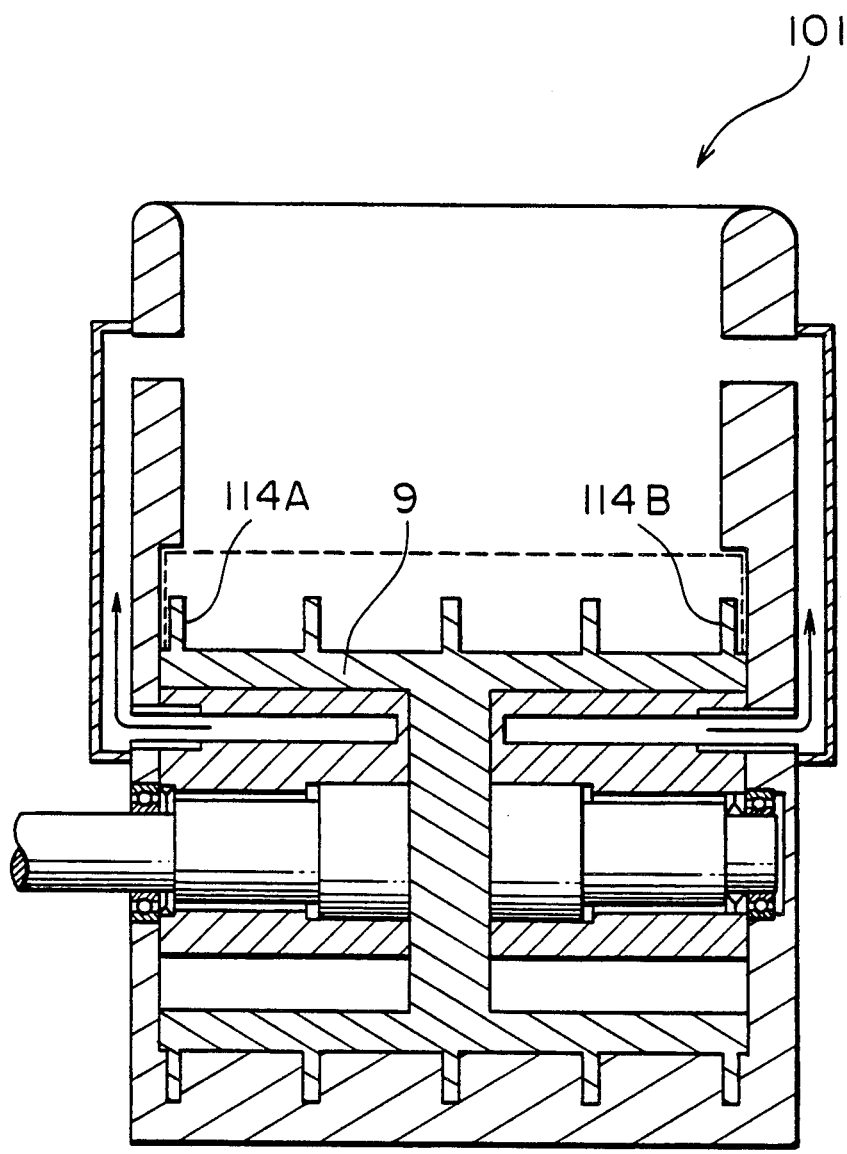
FIG. 5 shows a cross-sectional view of an apparatus of a second embodiment of this invention.
Figure 6:
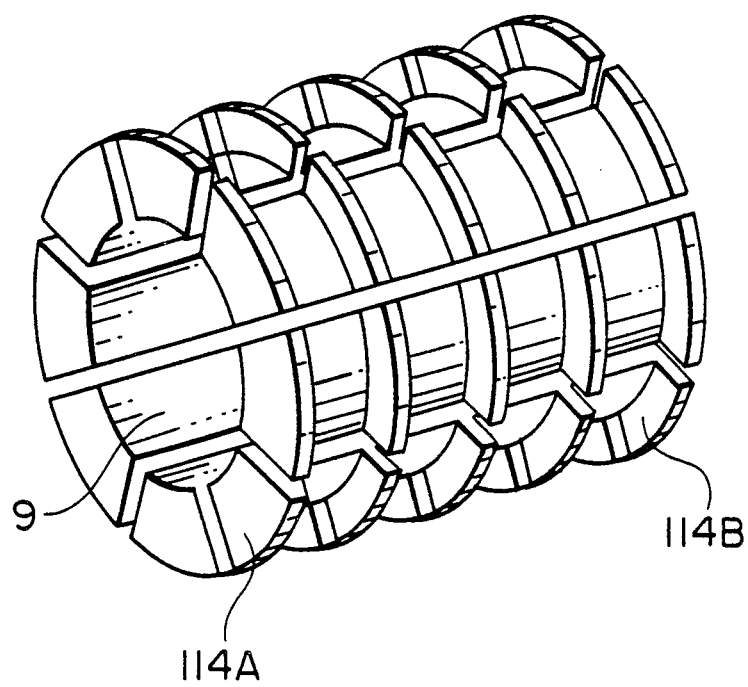
FIG. 6 shows a perspective view of the drum used in the apparatus of FIG. 5.

FIGS. 5 shows an apparatus (101) of a second embodiment of this invention. The construction of the apparatus (101) is the same as that of the apparatus (1) of the first embodiment, shown in FIG. 6. In this embodiment, all compartments are defined between any adjacent pair of the flanges (14). In contrast, both end sections of the space (27) of the first embodiment are defined by one end wall of the housing and its adjacent flange (14).

Effect of this invention

As we discussed above, in this invention the quantity of the material extruded from the plurality of the exit ports is the same and cannot change even if the material clogs one of the exit ports. Therefore, an uneven supply of the material extruded from the plurality of exit ports can be completely eliminated.

We claim:

1. An apparatus for quantitatively extruding food material, comprising:
   (a) a hopper for food material,
   (b) an eccentrically formed cylindrical housing mounted on the bottom of said hopper, having a cylindrical side wall, which is open at the top part that faces the hopper, and two end walls, said housing being provided with a plurality of exit ports positioned away from said hopper and arranged on said cylindrical side wall in the axial direction of said housing,
   (c) a rotating hollow cylindrical drum disposed in said housing, operatively connected to an axis, said axis in turn being connected to a motor, said drum having a plurality of slits formed radially through the peripheral body thereof and extending in the axial direction of said peripheral body, said side wall of said housing so formed that the periphery of said drum and the inner surface of said side wall of said housing downstream of said hopper in the direction of rotation of said drum defining a space progressively narrowing in its cross-section toward said exit ports, and slidably engaging each other downstream of said exit parts in the direction of rotation of said drum, said drum further having a plurality of flanges formed on the peripheral body thereof, and extending to engage the inner surface of said housing to divide said space into as many sections as the number of said exit ports, said sections communicating with the respective exit ports,
   (d) a plurality of blades, inserted into each of said slits, and of cross-sectional dimensions defined such that they slidably fit in said slits, each said blade being provided with a recess on its trailing surface extending in the radial direction over a distance slightly greater than thickness of the peripheral body of said drum,
   (e) an eccentric cylindrical cam mounted on said axis of said drum, the periphery thereof being radially spaced apart from the inner surface of said side wall of said housing by a distance equal to the radial width of said blades, engaging said peripheral body of said drum at the top portion of said drum and being progressively separated from said peripheral body in the direction of rotation of the drum defining an inner chamber together with the end walls of the housing, and enlarging in its cross-section toward said exit ports,
   (f) an exit path connecting said inner chamber to said hopper,
wherein each of said blades is slidably movable as said drum rotates along said periphery of said eccentric cam and said inner surface of said side wall of said housing, so that when the rotation brings said blade to face the bottom of said hopper the outward part of said blade is arranged to protrude into said hopper to introduce said food material into each of said sections of said space to said inner chamber for releasing into said inner chamber the air trapped in a compartment formed by said two adjacent blades and the drum, an adjacent pair of said flanges or one said flange and an end wall and the inner wall of said housing, and to retract to a point where the outward end of said blade becomes flush with the periphery of said drum when said blade has moved past said exit ports.

2. The apparatus of claim 1, wherein said blade is adapted to move relative to said drum to close said path from said space to said inner chamber when it arrives at an area adjacent said exit ports.

3. The apparatus of claim 1, wherein said space comprises a section having uniform dimensions adjacent said exit ports upstream thereof in the direction of rotation of said drum.

4. The apparatus of claim 1 or 3, wherein said exit path is positioned near the top part of said inner chamber and said inner chamber is formed so that it narrows in cross-section toward said exit path.

5. The apparatus of claim 1 or 3, wherein said exit path is formed through said eccentric cam.

6. The apparatus of claim 1 or 3, further comprising a track for said blades provided on the end walls of the housing in the area where it faces the hopper, said track being radial and equidistant from the surface of said eccentric cam by a distance equal to the radial width of each said blade.

7. The apparatus of claim 3, wherein said uniformly dimensioned section extends over a distance that is at least the same as the distance between any adjacent pair of said blades.

8. The apparatus of claim 3, wherein said blade is adapted to move relative to said drum to close said path from said space to said inner chamber when it arrives at said uniform dimensional section.

* * * * *

UNITED STATES PATENT AND TRADEMARK OFFICE
CERTIFICATE OF CORRECTION

PATENT NO. : 4,995,804
DATED : February 26, 1991
INVENTOR(S) : Koichi HIRABAYASHI It is certified that error appears in the above-identified patent and that said Letters Patent is hereby corrected as shown below:

Claim 1, col. 7, line 33, "parts" should be --ports--.

Signed and Sealed this

Twenty-eighth Day of July, 1992

Attest:

DOUGLAS B. COMER

*Attesting Officer*   Acting Commissioner of Patents and Trademarks